United States Patent [19]

Hanson et al.

[11] Patent Number: 5,362,270
[45] Date of Patent: Nov. 8, 1994

[54] SURFBOARD LEASH RETAINER

[76] Inventors: Eric Hanson, 4884 Coronodo Ave.; Christopher Dahlen, 5067 Niagara Ave., both of San Diego, Calif. 92107

[21] Appl. No.: 106,843

[22] Filed: Aug. 16, 1993

[51] Int. Cl.⁵ ............................................. A63C 15/06
[52] U.S. Cl. ..................................... 441/75; 114/39.2
[58] Field of Search ................ 114/39.2, 218; 441/74, 441/75

[56] References Cited

U.S. PATENT DOCUMENTS

| | | | |
|---|---|---|---|
| 2,994,293 | 8/1961 | Frenck | 114/218 |
| 3,897,745 | 8/1975 | Hutchings | 114/218 |
| 4,604,959 | 8/1986 | Menear | 114/39.2 |
| 4,610,634 | 9/1986 | Kimura | 441/75 |
| 4,775,345 | 10/1988 | Gifford | 441/75 |

*Primary Examiner*—Jesus D. Sotelo
*Attorney, Agent, or Firm*—Gilliam, Duncan & Harms

[57] ABSTRACT

A surfboard leash retainer for removably securing the free or surfer attachment end of a surfboard leash to the surfboard when the surfboard is being transported, not in use or stored. The retainer takes the form of either a fixed-in-place or removable retainer positioned near the forward most end of a surfboard while the attached end of the surfboard leash is fixedly attached near the rear-most end of the surfboard. The fixed-in-place retainer is either adhered to the board as an add-on or attached to the board as a step of the construction of the board. The removably attached retainer can be in the form of a resilient suction cup. The upper or leash retainer surface includes a channel with a restricted opening through which the leash can be forced and held in the channel by the restriction. The retainer or leash or both are constructed of a resilient material to allow the leash to be easily forced past the restriction into the channel and held thereby until forcibly removed.

9 Claims, 1 Drawing Sheet

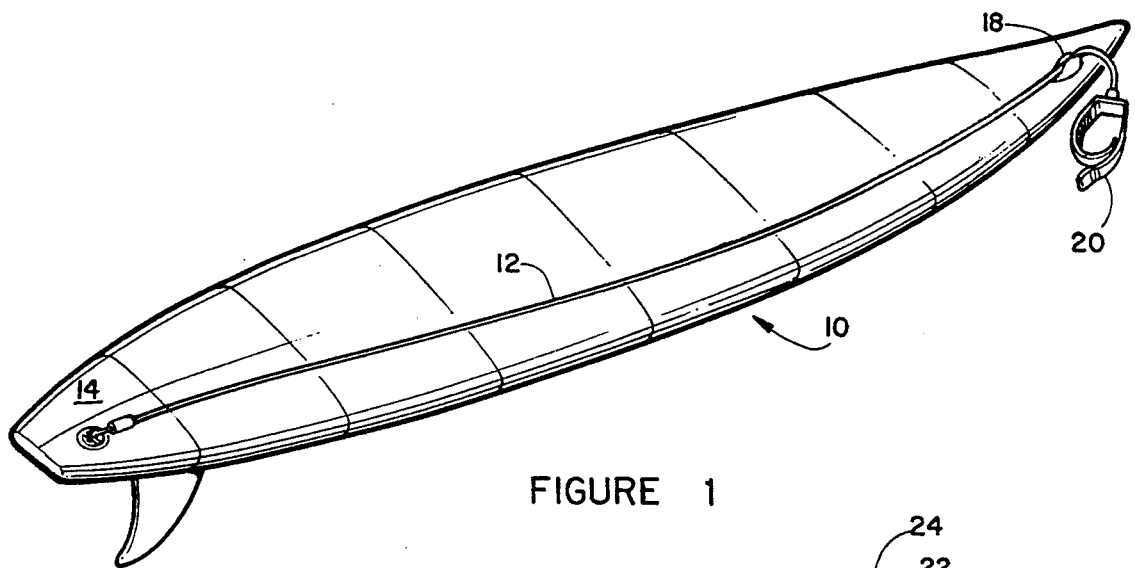
FIGURE 1
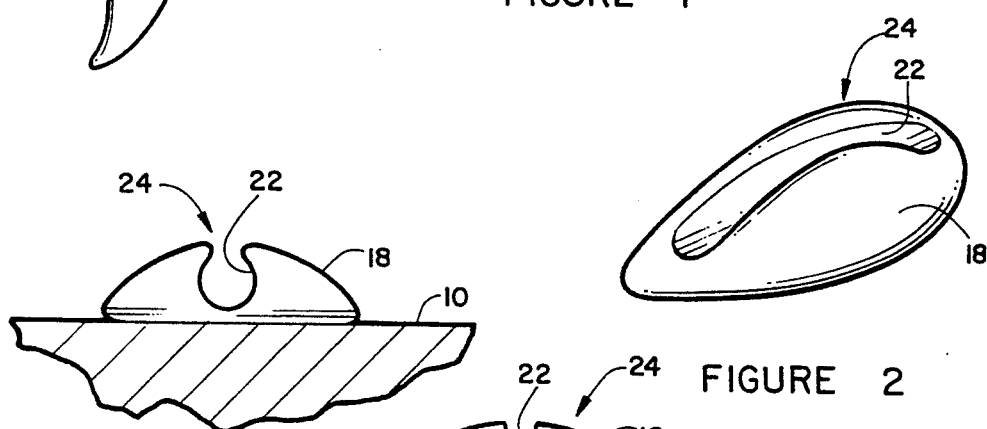
FIGURE 2
FIGURE 3A
FIGURE 3C
FIGURE 3B
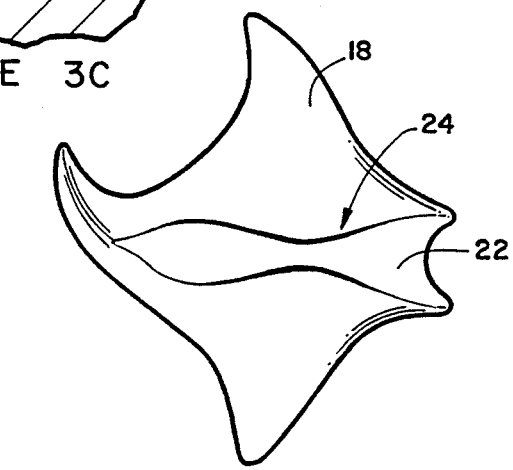
FIGURE 4
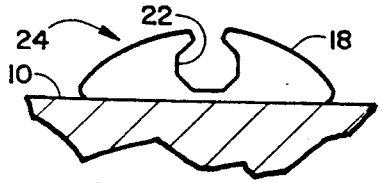
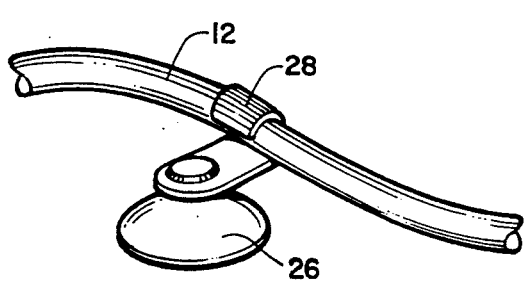
FIGURE 6
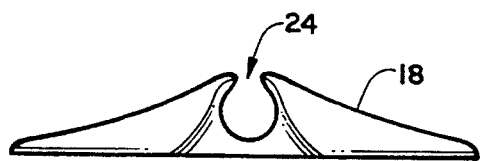
FIGURE 5

SURFBOARD LEASH RETAINER

BACKGROUND OF THE INVENTION

The invention is directed to a device for retaining the free end of a surfboard leash when the surfboard is being transported, when not in use or stored.

In order to locate a surfboard in the water when separated from the surfer one means is to employ a leash one end of which is fixedly attached to the rear of the surfboard and the other end which is attached to the ankle of the surfer. This allows the dismounted surfer to pull on the leash bringing the surfboard to him. When the surfboard is not in use the end of the leash formerly attached to the surfer now is free to dangle and trail making the surfboard transport or storage unnecessarily awkward and causes wear and damage to the leash.

Presently surfers merely wrap the leash around the surfboard from side to side for leash storage when the surfboard is not in use.

Storage of the leash in this manner creates various problems. One of the problems is the deforming of the edges of the surfboard where the normally round configured leash is wound thereby causing damage to the surfboard both physically and aesthetically.

Another problem is that after the leash begins to age the sharp bends about the surfboard side edges break or crimp the leash causing deterioration and requiring its premature replacement.

These and other problems with the storage of the leash when the surfboard is not in use have not been overcome until the emergence of the instant invention.

SUMMARY OF THE INVENTION

This invention is directed to a retainer which is attached either fixedly or removably to the forward end of a surfboard for receiving and retaining the distal or surfer ankle attachment end of a surfboard leash when the board is being transported, not in use or stored.

The leash of a surfboard is sufficiently long to serve the purpose intended, i.e. to retain a surfboard attachment to the using surfer so as to prevent injury to the surfer when becoming dismounted from the surfboard and enabling the surfer to recover the board for remounting.

The leash is fixedly attached to the rear end of the surfboard in a flexible manner such as a pivotal connection or the like and extends the desired or selected length and has an ankle cuff on the distal end for attachment to the ankle of the surfer when in use.

The leash retainer is either fixedly attached to the upper (top) or lower (bottom) surface of the surfboard during the construction process or attached with adhesive as an after construction add-on or is removably attached by means of a suction cup.

The fixed-in-place leash retainer has a longitudinal channel which extends parallel with the longitudinal center line of the surfboard and includes a restriction that runs along at least a portion of the channel. The channel has the approximate dimension of the leash and the restriction reduces the entrance to the channel to a dimension less than that of the leash thereby restricting the entrance of the leash into the channel of the retainer. Either the retainer or the leash or both are formed from material sufficiently resilient to allow the leash to be forced past the restriction thereby retaining the leash in the groove.

In the removable version of the retainer a clamp surrounds the leash at or near the ankle cuff securing the leash to the removable retainer.

In use, the channel of the the-fixed-in place retainer receives the leash which is stretched in a taught fashion along the upper or lower surface of the surfboard thereby retaining the leash in a surfboard transportable or storage configuration.

In use the removably attached retainer is fixedly attached to the leash near the ankle cuff and is stretched out along the upper or lower surface of the surfboard to a position near the front end of the surfboard and applied to the surface of the surfboard and is held there by the suction cup attachment. It should be noted that the location of there suction cup attachment to the leash provides for retaining the maximum amount of leash along the upper or lower surface of the surfboard without extending the suction cup beyond the front of the surfboard.

An object of this invention is to provide a means of for securing a surfboard leash to the surfboard when the board is being transported, not in use or stored.

Another object of this invention is to provide a means for attaching the free end of a surfboard leash to the surfboard with out causing damage to the surfboard or to the leash.

These and other objects and advantages of the present invention will become apparent to those skilled in the art after considering the following detailed specification in which the preferred embodiments are described in conjunction with the accompanying drawing Figures.

BRIEF DESCRIPTION OF THE DRAWING FIGURES

FIG. 1 is a perspective showing of a surfboard with the retainer of the invention attached thereto with the leash attached to the retainer in a transport or storage mode;

FIG. 2 is a perspective showing of a first embodiment of the leash retainer of the invention;

FIGS. 3A, 3B and 3C are end view showings of first, second and third embodiments of the leash retainer of FIG. 2;

FIG. 4 is a top plan showing of a fourth embodiment of the leash retainer of the invention;

FIG. 5 is an end view of the leash retainer of FIG. 4; and

FIG. 6 is a fifth embodiment of the leash retainer of the invention.

DETAILED DESCRIPTION OF THE PREFERRED EMBODIMENTS

Referring now to the various drawing Figures, FIG. 1 depicts a surfboard 10 with a leash 12 attached to the rear upper surface 14 of the surfboard. The leash is shown extending along the upper surface of the surfboard toward the front end 16 where it is removably attached to a fixed in position retainer 18. The distal end of the leash has a surfer angle cuff 20 attached thereto. The cuff is secured around the ankle of a surfer (not shown) when the surfboard is in use by a surfer to prevent loss of the surfboard when the surfer is dismounted therefrom.

In the embodiment shown in drawing FIGS. 1–4, the retainer is attached to the upper surface of the surfboard by any suitable adhesive.

Referring now specifically to drawing FIGS. 2, 3A, 3B and 3C, the retainer 18 is shown in a streamlined configuration. Centrally positioned along the front to back of the retainer is a channel 22 of a dimension slightly larger than the dimension of the leash 12 so the leash can be received and held within the channel. The opening 24 into the channel has a smaller dimension than the dimension of the channel thereby restricting entry of the leash. Either the leash or the retainer or both are resilient so that the leash can be forced into the channel past the smaller opening 24 both for installation therein and removal therefrom and yet firmly hold the leash within the channel when desired for surfboard transport, nonuse or storage.

FIGS. 4 and 5 depict a fourth embodiment of the retainer 18 of the invention. This embodiment serves the same purpose as the other embodiment and merely takes a more fanciful form of a streamlined sea creature.

FIG. 6 is a third embodiment of the retainer of the invention which is removably attached to the surfboard in the same location as the fixedly attached retainer by means of a suction cup 26 which is attached to the leash 12 by means of a clamp 28. The clamp is firmly attached to the leash in such a manner that it can be moved relative to the leash with effort to adjust its position along the leash to accommodate different length surfboards and leashes.

Typically the leashes are formed of a resilient plastic urethane or the like suitable for the purpose intended. The retainers 18 can be formed of a like or similar material or any material suitable for the purpose intended.

While there has been shown and described preferred embodiments of the surfboard leash retainer in accordance with the invention, it will be appreciated that many changes and modifications may be made therein without, however, departing from the essential spirit thereof.

What is claimed is:

1. A surfboard leash retainer in combination with a surfboard having an upper and lower surface with rear and front ends with a leash attached to the rear end with the opposite distal end extending a selected distance and having a cuff for the attachment to an ankle of a surfer which is attached to said distal end comprising:

said retainer being positioned near to said front end of said surfboard, said retainer having a vertical channel extending substantially parallel with the longitudinal center line of said surfboard, said channel having an opening from the upper exterior thereof of a dimension less than that of said channel; and said leash having a dimension smaller than said channel and a dimension larger than said opening, when said leash is forced through said opening into said channel the leash is held in said channel until forced from said channel back through said opening whereby said leash can be held within said channel for transport, nonuse and storage of said surfboard and removed from said channel for surfing with said surfboard.

2. The invention as defined in claim 1 wherein said retainer is fixed in place on one of said surfaces of said surfboard.

3. The invention as defined in claim 1 wherein said retainer is removably attached in place on one of said surfaces of said surfboard.

4. The invention as defined in claim 1 wherein said retainer is formed of a resilient material.

5. The invention as defined in claim 1 wherein said retainer is a suction cup attached to said leash adjacent to the distal end thereof.

6. The invention as defined in claim 1 wherein said channel is substantially circular.

7. The invention as defined in claim 1 wherein said retainer is streamlined in shape.

8. The invention as defined in claim 1 wherein said retainer is adhered to one of said surfaces of said surfboard.

9. The invention as defined in claim 1 wherein said retainer is formed in the upper surface of said surfboard during construction thereof.

* * * * *